United States Patent
Oba et al.

(10) Patent No.: US 7,094,720 B2
(45) Date of Patent: Aug. 22, 2006

(54) DIELECTRIC CERAMIC COMPOSITION AND DIELECTRIC RESONATOR MADE FROM THE COMPOSITION

(75) Inventors: Takashi Oba, Ise (JP); Hisashi Koduka, Bisai (JP); Kazuhisa Itakura, Komaki (JP)

(73) Assignee: NKG Spark Plug Co., Ltd., Nagoya (JP)

( * ) Notice: Subject to any disclaimer, the term of this patent is extended or adjusted under 35 U.S.C. 154(b) by 0 days.

(21) Appl. No.: 10/394,645

(22) Filed: Mar. 24, 2003

(65) Prior Publication Data

US 2004/0029709 A1 Feb. 12, 2004

(30) Foreign Application Priority Data

Mar. 26, 2002 (JP) ............................. 2002-86482

(51) Int. Cl.
*C04B 35/495* (2006.01)

(52) U.S. Cl. .................... 501/135; 333/219.1
(58) Field of Classification Search ................ 501/135; 333/219.1
See application file for complete search history.

(56) References Cited

U.S. PATENT DOCUMENTS 6,117,806 A  9/2000  Yokoi et al. ................ 501/135
6,569,796 B1 *  5/2003  Itakura et al. .............. 501/135

FOREIGN PATENT DOCUMENTS

| EP | 0 838 446 | 5/1978 |
| JP | 53 060540 | 5/1978 |
| JP | 60 200855 | 10/1985 |
| JP | 05 002917 | 1/1993 |

* cited by examiner

*Primary Examiner*—Karl Group
(74) *Attorney, Agent, or Firm*—Stites & Harbison PLLC; Ross F. Hunt, Jr.

(57) ABSTRACT

A dielectric ceramic composition is provided which exhibits a high unloaded quality factor ($Q_u$) and permits regulation of the relative dielectric constant ($\epsilon_r$) and the temperature coefficient ($\tau_f$) of resonance frequency ($f_o$) within specific ranges in accordance with use or application of the composition. A dielectric resonator is also provided which includes a resonator main body formed from the composition. The dielectric ceramic composition contains, as metallic components, Ba, Zn, Nb, Ta, and Sb, and the amounts of the metallic components, as reduced to their oxides, satisfy the following relations expressed in mol %: $57.5 \leq BaO \leq 62.6$; $16.0 \leq ZnO \leq 22.2$; $0 < Nb_2O_5 \leq 20.6$; $0 < Ta_2O_5 \leq 20.6$; and $0 < Sb_2O_3 \leq 5.9$.

6 Claims, 1 Drawing Sheet

DIELECTRIC CERAMIC COMPOSITION AND DIELECTRIC RESONATOR MADE FROM THE COMPOSITION

BACKGROUND OF THE INVENTION

1. Field of the Invention

The present invention relates to a dielectric ceramic composition and to a dielectric resonator, and, more particularly, to a dielectric ceramic composition which, when employed in a high-frequency setting, exhibits a high unloaded quality factor ($Q_u$) and permits regulation or variation of the relative dielectric constant ($\epsilon_r$) and the temperature coefficient ($\tau_f$) of resonance frequency ($f_o$) within specific ranges in accordance with the particular use or application of the composition. The invention also relates to a dielectric resonator comprising a resonator main body formed from the composition.

2. Description of the Related Art

Some conventional dielectric ceramic compositions are known to be useful in devices operating in high-frequency regions such as the microwave region. Such compositions are suitable for use in a variety of products including dielectric resonators, dielectric antennas, dielectric waveguides, dielectric substrates for microwave integrated circuits (MICs), and multi-layer ceramic capacitors.

In order to be employed in high-frequency operating regions such dielectric ceramic compositions must satisfy the following three basic requirements in accordance with the use or application thereof: (1) the unloaded quality factor ($Q_u$) must be high; (2) the relative dielectric constant ($\epsilon_r$) must be large and still must be capable of being regulated or varied over a range of values; and (3) the absolute value of the temperature coefficient ($\tau_f$) of the resonance frequency ($f_o$) of the composition must be small, and this temperature coefficient must be capable of being regulated or varied over a small range.

Previously proposed dielectric ceramic compositions for use in high-frequency operating regions include a dielectric ceramic composition containing Ba, Nb, Sb, and $O_2$ (Japanese Patent Application Laid-Open (kokai) No. 62-190608), and a dielectric ceramic composition containing Ba, Zn, Ta, and K (Japanese Patent Application Laid-Open (kokai) No. 11-71173).

Although such conventional dielectric ceramic compositions have a relatively high unloaded quality factor ($Q_u$), there are difficulties with the composition in varying or regulating the relative dielectric constant ($\epsilon_r$) and the temperature coefficient ($\tau_f$) of the resonance frequency ($f_o$) thereof, in use of the composition in, for example, a dielectric resonator, a dielectric antenna, a dielectric waveguide, a dielectric substrate for a microwave integrated circuit (MIC), or a multi-layer ceramic capacitor. Therefore, when the dielectric ceramic composition is produced, an appropriate metallic component must be selected based on the specific use of the composition and as a consequence, production of the dielectric ceramic composition is an intricate process.

SUMMARY OF THE INVENTION

One object of the present invention is to solve the aforementioned problems with conventional dielectric compositions. A further object is to provide a dielectric ceramic composition which exhibits a high unloaded quality factor ($Q_u$) and permits desired variation or regulation of the relative dielectric constant ($\epsilon_r$) and the temperature coefficient ($\tau_f$) of resonance frequency ($f_o$) within specific ranges in accordance with the requirements of the particular use of the composition. Another object is to provide a dielectric resonator comprising a resonator main body formed from the composition.

To achieve the aforementioned objects, the present inventors have performed extensive research with respect to the metallic components used in dielectric ceramic compositions and the amounts of the metallic components to be used, and the present invention is based on the results of that research.

In accordance with a first aspect of the present invention, in order to solve the aforementioned problems, there is provided a dielectric ceramic composition comprising, as metallic components, Ba, Zn, Nb, Ta, and Sb, wherein the amounts of the metallic components, as reduced to the oxides thereof, satisfy the following relations, expressed in mol %: (i) $57.5 \leq BaO \leq 62.6$; (ii) $16.0 \leq ZnO \leq 22.2$; (iii) $0 < Nb_2O_5 \leq 20.6$; (iv) $0 < Ta_2O_5 \leq 20.6$; and (v) $0 < Sb_2O_5 \leq 5.9$.

In a preferred embodiment of this dielectric ceramic composition, a dielectric ceramic composition comprises an alkali metal serving as a metallic component, wherein the amount of the alkali metal, as reduced to its oxide, satisfies the following relation, expressed in mol %: $0 < M_2O \leq 1.95$, where M represents the alkali metal. In an advantageous implementation of this embodiment of the dielectric ceramic composition, the aforementioned alkali metal is K.

In accordance with a further aspect of the present invention, there is provided a dielectric resonator comprising a resonator main body formed from the dielectric ceramic composition described above.

Further features and advantages of the present invention will be set forth in, or apparent from, the detailed description of preferred embodiments thereof which follows.

BRIEF DESCRIPTION OF THE DRAWINGS

The single FIGURE in the drawing is a cross-sectional view of a dielectric resonator in accordance with one preferred embodiment of the invention.

DESCRIPTION OF THE PREFERRED EMBODIMENTS

Figure 1:
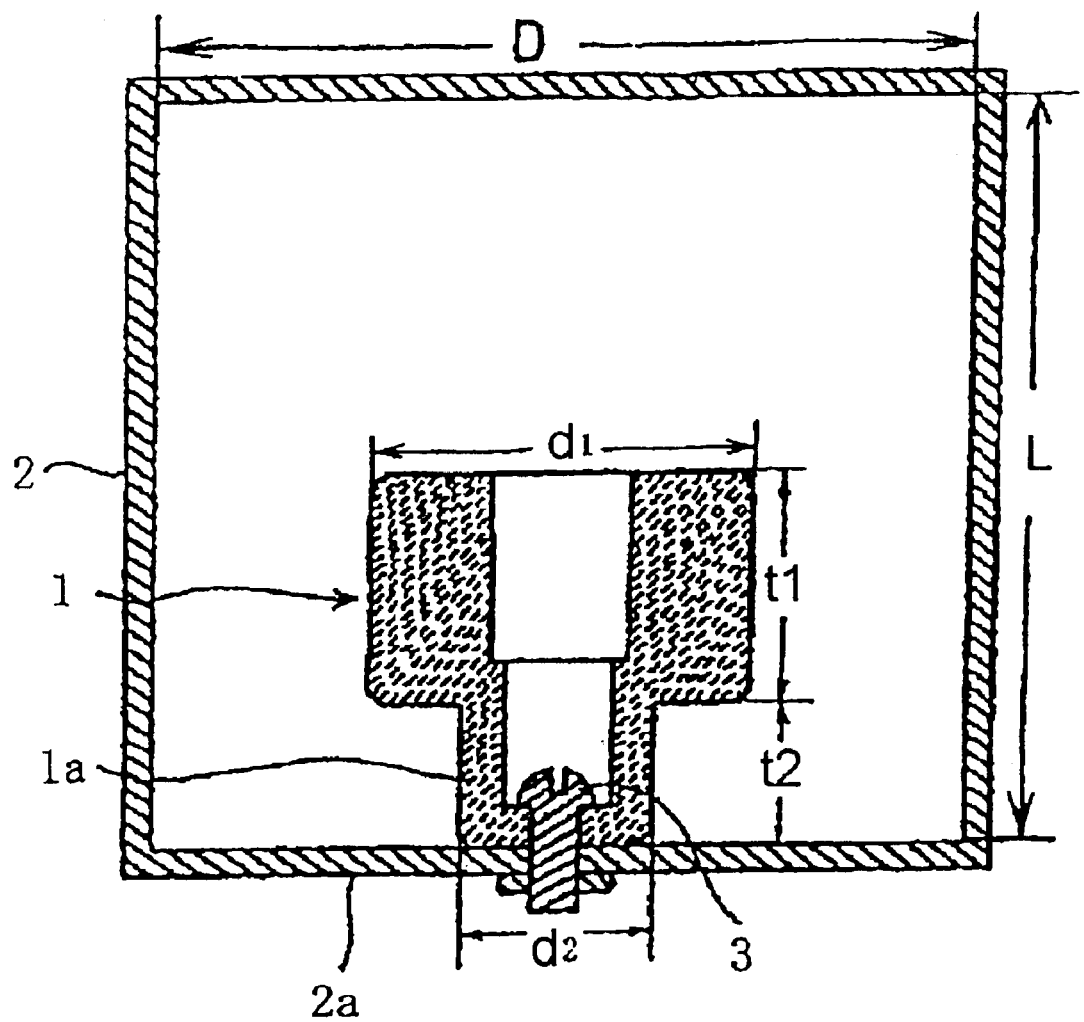

As indicated above, in accordance with one aspect of the present invention, there is provided a dielectric ceramic composition comprising, as metallic components, Ba, Zn, Nb, Ta, and Sb, wherein the amounts of the metallic components, as reduced to their oxides, satisfy the following relations, expressed in mol %: (i) $57.5 \leq BaO \leq 62.6$; (ii) $16.0 \leq ZnO \leq 22.2$; (iii) $0 < Nb_2O_5 \leq 20.6$; (iv) $0 < Ta_2O_5 \leq 20.6$; and (v) $0 < Sb_2O_5 \leq 5.9$.

Preferably, in the aforementioned dielectric ceramic composition, the amounts of Ba, Zn, Nb, Ta, and Sb, as reduced to their oxides, satisfy the following relations as expressed in mol %: $57.6 \leq BaO \leq 61.5$; $17.0 \leq ZnO \leq 20.0$; $6.0 \leq Nb_2O_5 \leq 17.0$; and $2.0 \leq Ta_2O_5 \leq 13.0$.

More preferably, $6.0 \leq Ta_2O_5 \leq 13.0$, and $0.08 \leq Sb_2O_3 \leq 2.3$, and, even more preferably, $1.0 \leq Sb_2O_3 \leq 2.3$.

When the amount of BaO is less than 57.5 mol %, the dielectric ceramic composition fails to exhibit a sufficiently high unloaded quality factor ($Q_u$), whereas when the amount of BaO exceeds 62.6 mol %, difficulty is encountered in performing sintering, and the dielectric ceramic composition fails to exhibit sufficiently high unloaded quality factor ($Q_u$).

When the amount of ZnO is less than 16.0 mol % or exceeds 22.2 mol %, the dielectric ceramic composition fails to exhibit a sufficiently high unloaded quality factor ($Q_u$).

When $Nb_2O_5$ is not contained or included in the composition (e.g., $Nb_2O_5$=0), the firing temperature becomes higher as compared with the case where $Nb_2O_5$ is included, whereas when the amount of $Nb_2O_5$ exceeds 20.6 mol %, the dielectric ceramic composition fails to exhibit a sufficiently high unloaded quality factor ($Q_u$).

When $Ta_2O_5$ is not contained in the composition or the amount of $Ta_2O_5$ exceeds 20.6 mol %, the dielectric ceramic composition fails to exhibit a sufficiently high unloaded quality factor ($Q_u$).

When $Sb_2O_3$ is not contained in the composition, the dielectric ceramic composition fails to exhibit a sufficiently high unloaded quality factor ($Q_u$), whereas when the amount of $Sb_2O_3$ exceeds 5.90 mol %, difficulty is encountered in performing sintering.

The dielectric ceramic composition of the present invention, which contains Ba, Zn, Nb, Ta, and Sb as essential components, may advantageously contain an additional metal, so long as the particular objects of the invention can be achieved.

Examples of the additional metal include alkali metals, and specific examples include Li, Na, K, Rb, Cs, and Fr. Of these, Na and K are preferred, and K is particularly preferred. An alkali metal serves in lowering the firing temperature during the course of production of the dielectric ceramic composition. More particularly, when K is incorporated into the composition, even if the firing temperature is low, the resultant composition exhibits well-balanced dielectric characteristics, i.e., a high relative dielectric constant ($\epsilon_r$), a high unloaded quality factor ($Q_u$), and a small absolute value of temperature coefficient ($\tau_f$).

In the dielectric ceramic composition, the amount of the alkali metal, as reduced to its oxide, preferably satisfies the following relation: $0<M_2O\leq1.95$, where M represents the alkali metal and the amount of the oxide is represented in units of mol %. In a more preferred embodiment of the dielectric ceramic composition, the amount of the alkali metal, as reduced to its oxide, satisfies the following relation: $0.1\leq M_2O\leq1.0$.

When an alkali metal is not contained in the composition, the dielectric ceramic composition exhibits a low unloaded quality factor ($Q_u$), whereas when the amount of the alkali metal exceeds 1.95 mol %, difficulty is encountered in performing sintering, and the dielectric ceramic composition may exhibit a low unloaded quality factor ($Q_u$).

The dielectric ceramic composition of the present invention can be produced through the following basic procedure: the raw materials are mixed together, the resultant mixture is calcined if desired, and the calcined product is subjected to molding, followed by firing. During molding, a binder may be employed.

Considering this procedure in more detail, examples of the raw materials include oxides of the aforementioned metals; and peroxides, hydroxides, carbonates, nitrates, and sulfates of the aforementioned metals, which can be formed into oxides of the raw materials through firing. Preferred examples of the raw materials include barium oxide, barium hydroxide, barium carbonate, zinc oxide, zinc hydroxide, zinc carbonate, niobium oxide, niobium hydroxide, niobium carbonate, tantalum oxide, tantalum hydroxide, tantalum carbonate, antimony oxide, antimony hydroxide, and antimony carbonate. Of these, oxides of the five metals first mentioned above are preferred. The dielectric ceramic composition of the present invention may also contain an additional metallic component, so long as the objects of the present invention can be achieved.

The raw materials are generally employed in the form of powder. The powdery raw materials are weighed such that the amounts of the aforementioned metals contained in the ceramic composition satisfy the above-described relations. The weighed raw materials are dry-mixed together for 20 to 30 minutes by use of, for example, a mixer, and then subjected to primary crushing by use of, for example, a vibration mill. Generally, resin balls or zirconia balls are employed as grinding balls. The crushing time is generally 2 to 4 hours. Typically, water is added to the powdery raw materials, and the raw materials are crushed until the average particle size of the powder becomes 2.0 µm or less. However, no particular limitations are imposed on the crushing conditions.

The thus-obtained mixture is dried, and if desired, the thus-dried mixture is calcined at 1,000 to 1,300° C. for a period of, for example, 2 to 10 hours. No particular limitations are imposed on the calcining conditions.

Subsequently, if desired, a molding binder is added to the calcined product. The resultant product is subjected to particle size regulation, and then molded into a product of arbitrary shape. The binder to be employed is preferably a water-soluble polymer. Examples of suitable polymers include polyvinyl alcohol, polyvinyl pyrrolidone, polyacrylic acid, polyacrylamide, polyethylene oxide, polyethyleneimine, and carboxymethyl cellulose. No particular limitations are imposed on the amount of the binder to be employed, but the amount of the binder is typically 1 to 10 parts by mass, and preferably 3 to 7 parts by mass, on the basis of 100 parts by mass of the calcined product.

Examples of the molding techniques that can be employed include mold pressing, cold isostatic pressing, and extrusion molding. After completion of molding, the molded product is subjected to a treatment for removing the employed binder. The conditions for removing the binder vary in accordance with the type of the binder, but in general, removal of the binder is performed by heating the molded product to a temperature higher than the decomposition temperature of the binder.

The dielectric ceramic composition of the present invention is preferably produced through firing of the molded product produced by the aforementioned molding technique. Firing of the molded product is performed in an oxidative atmosphere (e.g., air) or a non-oxidative atmosphere, at typically 1,300 to 1,700° C., and preferably 1,500 to 1,600° C., for typically 0.5 to 12 hours, and preferably 1 to 10 hours.

When employed in a high-frequency region, the dielectric ceramic composition of the present invention exhibits a high unloaded quality factor ($Q_u$) of at least 4,000 (5 GHz), a relative dielectric constant ($\epsilon_r$) of 20 to 40, and a temperature coefficient ($\tau_f$) of resonance frequency ($f_o$) of −20 to 20. More preferably, the high unloaded quality factor ($Q_u$) of the dielectric ceramic composition is 4,400 or more, and the temperature coefficient ($\tau_f$) is −10 to 10.

The unloaded quality factor ($Q_u$) is preferably measured using the method disclosed in JIS R1627 (1996). The unloaded quality factor ($Q_u$) is an index for the amount of energy accumulated in a resonator, i.e., the degree of dielectric loss of a dielectric ceramic composition.

The relative dielectric constant ($\epsilon_r$) is the real number portion of complex relative dielectric constant, and is also preferably determined using the method disclosed in JIS R1627 (1996).

The temperature coefficient ($\tau_f$) of resonance frequency ($f_o$) is also preferably measured using the method disclosed in JIS R1627 (1996). This temperature coefficient ($\tau_f$) indicates the temperature dependency of the resonance frequency, and is calculated by use of the following formula: $\tau_f = (1/f_1)[(f_2-f_1)/(T_2-T_1)] \times 10^6$, wherein $f_1$ represents the resonance frequency at $T_1°$ C., and $f_2$ represents the resonance frequency at $T_2°$ C.

The dielectric ceramic composition of the present invention exhibits excellent characteristics as described above, and is, therefore, suitable for use in, for example, a dielectric resonator operating in the microwave region, a substrate for a microwave integrated circuit, and an impedance regulator for a microwave circuit.

As indicated above, in accordance with a second aspect of the present invention, there is also provided a dielectric resonator comprising a resonator main body formed from the dielectric ceramic composition of the present invention described above.

Before considering the resonator in more detail, it is noted that in recent years, mobile communication systems, such as car telephones and cellular phones, have rapidly become quite prevalent, and communication systems employing microwaves, such as satellite broadcasting systems and satellite communication systems, have also been rapidly developing. Because of this trend, a demand has arisen for reducing the size of the devices employed in such communication systems, such as band-pass filters, and for increasing the frequency range over which the devices are employed.

By virtue of their high frequencies, microwaves are employed as carrier waves for transmitting a large number of signals. Microwaves are also suitable for use in multiplex communications in which radio waves of predetermined single frequency carry signals of hundreds to thousands of lines simultaneously. Dielectric resonators are widely employed in circuit devices which play an important role in receiving or transmitting such signals at the predetermined frequency.

The dielectric resonator of the present invention, which is designed to resonate at a specific frequency, is particularly suited for use in such devices. The dielectric resonator of the present invention is an element which resonates at a specific frequency, and in which electromagnetic waves are reflected almost completely at the interface between free space and the dielectric main body, so that electromagnetic energy is confined within the dielectric main body, and standing waves are produced.

The single figure in the drawings shows a preferred embodiment of the dielectric resonator of the present invention. The resonator includes the following basic elements: a resonator main body 1 equipped with a support member 1a, a cylindrical metallic container 2 including a bottom surface 2a, and a fastening device 3. The resonator main body 1 is formed from the dielectric ceramic composition of the present invention described above.

In the dielectric resonator of the illustrated embodiment, the resonator main body 1 is disposed in the cylindrical metallic container 2. More particularly, the main body 1 is mounted on a center portion of the bottom 2a of the metallic container such that the support member 1a faces the bottom 2a. The resonator main body 1 and the metallic container 2 are joined together by means of the fastener device 3 (which, e.g., comprises a screw or a bolt and a nut, as shown) that extends through a hole provided at the center portion.

The resonator main body 1 of the dielectric resonator, having the illustrated configuration, is preferably produced from a molded product formed from the dielectric ceramic composition of the present invention. The molded product is formed through molding of the dielectric ceramic composition to produce a byproduct of a predetermined shape by nature of the molding step of the manufacturing process for the composition. In this process, as described above, raw materials are mixed together, the resultant mixture is calcined if desired, and the calcined product is subjected to molding, followed by firing.

The thus-produced dielectric resonator of the present invention therefore includes a resonator main body formed of a dielectric ceramic composition which exhibits a high unloaded quality factor ($Q_u$) and which permits arbitrary varying or regulation, as desired, of the relative dielectric constant ($\epsilon_r$) and the temperature coefficient ($\tau_f$) of resonance frequency ($f_o$) within certain ranges. Therefore, the dielectric resonator is highly suitable for use in multiplex communications, in which carrier waves for transmitting a large number of signals are employed, and radio waves of a predetermined single frequency carry signals of hundreds to thousands of lines simultaneously.

EXAMPLES

The present invention will next be described in more detail by reference to certain examples, which should not be construed as limiting the invention thereto.

Examples 1 through 9 and Comparative Examples 1 through 9

Powdery raw materials (the amounts of which are shown in Table 1) were dry-mixed by use of a mixer for three hours, and the resultant mixture was subjected to primary crushing. The resultant mixture was calcined in an air atmosphere at 1,200° C. for two hours. Subsequently, polyvinyl alcohol (8 mass %), serving as a binder, and water (92 mass %), were added to the calcined powder, and the resultant mixture was subjected to secondary crushing in a ball mill employing zirconia balls (size: 10 mmφ) at 90 rpm for 10 hours. Subsequently, the thus-crushed powder was dried under vacuum (0.4 Torr, 45° C., 20 hours), to thereby produce granulation of the powder. The thus-granulated powder was molded into a cylindrical product (diameter: 19 mmφ, thickness: 11 mmt).

Subsequently, the molded product was subjected to degreasing in air at 500° C. for two hours, followed by firing at 1,550° C. for three hours. Table 2 shows the compositional proportions of the thus-produced dielectric ceramic composition. The circumference and end surfaces of thus-fired product were polished, and the resultant product was employed as a dielectric ceramic composition sample.

Table 3 shows the results of tests used in evaluation of certain dielectric characteristics of the sample.

In the evaluation of these dielectric characteristics, the surfaces of the above-obtained sample were polished to thereby prepare a test piece or test sample (diameter: 16 mm, height: 8 mm). The test piece was subjected to a measurement of unloaded quality factor ($Q_u$), relative dielectric constant ($\epsilon_r$), and temperature coefficient ($\tau_f$) (temperature range: 25 to 80° C.) at a frequency of 5 GHz by means of the parallel conductive plate dielectric resonator method (operating in the $TE_{011}$ mode).

TABLE 1

| | Raw materials (mol %) | | | | | |
|---|---|---|---|---|---|---|
| | BaO | ZnO | $Nb_2O_5$ | $Ta_2O_5$ | $Sb_2O_3$ | $K_2O$ |
| Example 1 | 60.1 | 19.3 | 10.5 | 8.69 | 1.39 | 0.00 |
| Example 2 | 59.4 | 19.1 | 18.6 | 0.75 | 0.98 | 1.13 |
| Example 3 | 59.4 | 19.1 | 16.7 | 2.71 | 0.98 | 1.13 |
| Example 4 | 59.4 | 19.1 | 12.7 | 6.63 | 0.98 | 1.13 |
| Example 5 | 59.4 | 19.1 | 12.4 | 8.59 | 0.47 | 1.13 |
| Example 6 | 59.4 | 19.1 | 10.8 | 8.59 | 0.98 | 1.13 |
| Example 7 | 59.4 | 19.1 | 10.4 | 8.59 | 1.37 | 1.13 |
| Example 8 | 59.4 | 19.1 | 9.6 | 8.59 | 2.16 | 1.13 |
| Example 9 | 59.4 | 19.1 | 6.5 | 12.51 | 1.37 | 1.13 |
| Comparative Example 1 | 54.4 | 22.0 | 11.9 | 9.71 | 2.06 | 0.00 |
| Comparative Example 2 | 63.0 | 17.8 | 9.6 | 7.87 | 1.67 | 0.00 |
| Comparative Example 3 | 60.8 | 14.6 | 13.4 | 9.32 | 1.98 | 0.00 |
| Comparative Example 4 | 58.0 | 23.8 | 8.0 | 8.42 | 1.79 | 0.00 |
| Comparative Example 5 | 57.3 | 16.2 | 22.2 | 2.77 | 1.52 | 0.00 |
| Comparative Example 6 | 57.0 | 16.7 | 3.8 | 20.79 | 1.67 | 0.00 |
| Comparative Example 7 | 60.3 | 19.3 | 18.9 | 0.00 | 1.45 | 0.00 |
| Comparative Example 8 | 60.0 | 19.6 | 11.6 | 8.75 | 0.00 | 0.00 |
| Comparative Example 9 | 56.3 | 18.4 | 10.9 | 8.21 | 6.22 | 0.00 |

TABLE 2

| | Dielectric ceramic compositions (mol %) | | | | | |
|---|---|---|---|---|---|---|
| | BaO | ZnO | $Nb_2O_5$ | $Ta_2O_5$ | $Sb_2O_3$ | $K_2O$ |
| Example 1 | 60.2 | 18.9 | 10.2 | 8.63 | 2.01 | 0.000 |
| Example 2 | 60.3 | 18.9 | 18.4 | 0.76 | 1.44 | 0.246 |
| Example 3 | 60.2 | 18.9 | 16.4 | 2.73 | 1.43 | 0.246 |
| Example 4 | 60.3 | 19.0 | 12.4 | 6.42 | 1.57 | 0.286 |
| Example 5 | 59.7 | 18.6 | 13.5 | 9.01 | 0.73 | 0.236 |
| Example 6 | 61.0 | 17.9 | 11.1 | 8.65 | 1.12 | 0.171 |
| Example 7 | 60.2 | 19.1 | 10.2 | 8.53 | 1.81 | 0.146 |
| Example 8 | 60.0 | 19.2 | 9.7 | 8.67 | 2.18 | 0.247 |
| Example 9 | 60.0 | 18.9 | 6.4 | 12.52 | 2.00 | 0.245 |
| Comparative Example 1 | 54.9 | 21.7 | 11.6 | 9.71 | 2.06 | 0.000 |
| Comparative Example 2 | 63.5 | 17.6 | 9.4 | 7.86 | 1.67 | 0.000 |
| Comparative Example 3 | 61.2 | 14.4 | 13.1 | 9.30 | 1.97 | 0.000 |
| Comparative Example 4 | 58.5 | 23.5 | 7.9 | 8.41 | 1.78 | 0.000 |
| Comparative Example 5 | 57.9 | 16.0 | 21.8 | 2.77 | 1.52 | 0.000 |
| Comparative Example 6 | 57.4 | 16.5 | 3.7 | 20.73 | 1.67 | 0.000 |
| Comparative Example 7 | 60.9 | 19.1 | 18.5 | 0.00 | 1.45 | 0.000 |
| Comparative Example 8 | 60.5 | 19.4 | 11.4 | 8.74 | 0.00 | 0.000 |
| Comparative Example 9 | 56.7 | 18.2 | 10.7 | 8.20 | 6.20 | 0.000 |

TABLE 3

| | $Q_u$ (5 GHz) | $\epsilon_r$ | $\tau_f$ (ppm/° C.) |
|---|---|---|---|
| Example 1 | 4201 | 29.6 | 5.1 |
| Example 2 | 4360 | 34.0 | 19.9 |
| Example 3 | 4359 | 33.7 | 17.2 |
| Example 4 | 4250 | 32.2 | 13.5 |
| Example 5 | 4322 | 31.8 | 11.2 |
| Example 6 | 4845 | 31.1 | 7.2 |
| Example 7 | 4975 | 30.1 | 5.9 |
| Example 8 | 4965 | 28.5 | −1.9 |
| Example 9 | 5335 | 29.1 | −0.9 |
| Comparative Example 1 | 3877 | 30.0 | 5.5 |
| Comparative Example 2 | 3952 | 30.4 | 7.0 |
| Comparative Example 3 | 3549 | 29.0 | 3.6 |
| Comparative Example 4 | 3270 | 30.6 | 8.3 |
| Comparative Example 5 | 2914 | 32.1 | 4.6 |
| Comparative Example 6 | 3755 | 30.8 | −2.7 |
| Comparative Example 7 | 3886 | 34.5 | 23.3 |
| Comparative Example 8 | 3669 | 33.2 | 21.4 |
| Comparative Example 9 | 3976 | 23.1 | −25.9 |

As is clear from the results shown in Table 3, the dielectric ceramic composition of the present invention exhibits a high unloaded quality factor ($Q_u$), and has a relative dielectric constant ($\epsilon_r$) and a temperature coefficient ($\tau_f$) of resonance frequency ($f_o$) which vary over wide ranges.

Example 10

A dielectric resonator as shown in the single figure in the drawings was produced from the dielectric ceramic composition obtained in Example 6.

In the process for producing the dielectric ceramic composition of Example 6, the dielectric ceramic composition was molded into a product in the molding step. In producing the resonator, the following steps were carried out: a resonator main body 1 was formed from the molded product; the resonator main body 1 was placed in a cylindrical metallic container 2; the main body 1 was mounted on a center portion of a bottom 2a of the metallic container 2 such that a support member 1a faced the bottom 2a; and the resonator main body 1 and the metallic container 2 were joined together by means of a fastener 3 in the form of a bolt and a nut via a hole provided at the center portion.

The dimensions or sizes of the various parts or portions, denoted D, L, $d_1$, $d_2$, $l_1$, and $l_2$ in the drawings, were determined such that the resonance frequency was 1,770 MHz in a $TE_{011}$ mode; specifically, the housing width, D, was determined to be 80 mmφ, the housing height, L, to be 70 mm, the width, $d_1$, of the upper part of the resonator structure to be 38 mmφ, the width, $d_2$, of the support member 1a to be 32 mmφ, the height, t1, of the upper part of the resonator structure to be 17 mm, and the height, t2, of the support member 1a to be 20 mm, and the quality factor $Q_u$ of the resonator was measured. As a result of this measurement, $Q_u$ was found to be 40,518.

It will be apparent from the foregoing that the dielectric ceramic composition of the present invention exhibits high unloaded quality factor ($Q_u$) and permits variation or regulation of the relative dielectric constant ($\epsilon_r$) and the temperature coefficient ($\tau_f$) of resonance frequency ($f_o$) over specific ranges, as desired, based on the characteristics of the use or application of the composition, i.e., the use to which the composition is to be put. The invention also concerns a dielectric resonator comprising a resonator main body formed from this composition. Therefore, the present invention is of great advantage in the design and production of various dielectric devices which operate in high-frequency regions such as the microwave region.

Although the invention has been described above in relation to preferred embodiments thereof, it will be understood by those skilled in the art that variations and modifications can be effected in these preferred embodiments without departing from the scope and spirit of the invention.

What is claimed:

1. A dielectric ceramic composition comprising, as metallic components, Ba, Zn, Nb, Ta, and Sb, wherein the amounts of the metallic components, as reduced to the oxides thereof, satisfy the following relations, as expressed in mol %: $57.5 \leqq BaO \leqq 62.6$; $6.0 \leqq ZnO \leqq 22.2$; $0 < Nb_2O_5 \leqq 20.6$; $6.0 \leqq Ta_2O_5 \leqq 13.0$; and $1.0 \leqq Sb_2O_3 \leqq 2.3$ and wherein an alkali metal is included as a further metallic component.

2. A dielectric ceramic composition according to claim 1, wherein the amount of the alkali metal, as reduced to its oxide, satisfies the following relation, as expressed in mol %: $0 < M_2O \leqq 1.95$, where M represents the alkali metal.

3. A dielectric ceramic composition according to claim 2, wherein the alkali metal is K.

4. A dielectric ceramic composition according to claim 1, wherein the dielectric ceramic composition exhibits a high unloaded quality factor ($Q_u$) of at least 4,000, a relative dielectric constant ($\epsilon_r$) of 20 to 40, and a temperature coefficient ($\tau_f$) of resonance frequency ($f_o$) of −20 to 20.

5. A dielectric resonator comprising a resonator main body formed from a dielectric ceramic composition comprising, as metallic components, Ba, Zn, Nb, Ta, and Sb, wherein the amounts of the metallic components, as reduced to the oxides thereof, satisfy the following relations, as expressed in mol %: $57.5 \leqq BaO \leqq 62.6$; $6.0 \leqq ZnO \leqq 22.2$; $0 < Nb_2O_5 \leqq 20.6$; $0 < Ta_2O_5 \leqq 13.0$; and $1.0 \leqq Sb_2O_3 \leqq 2.3$ and wherein an alkali metal is incuded as further metallic component.

6. The dielectric ceramic composition of claim 1, wherein the dielectric ceramic composition has a high unloaded quality factor ($Q_u$) of at least 4,400.

* * * * *